US012751893B2

(12) United States Patent
Wiles

(10) Patent No.: US 12,751,893 B2
(45) Date of Patent: Oct. 6, 2026

(54) MASSAGE ATTACHMENT FOR USE WITH AN ELECTRIC TOOTHBRUSH

(71) Applicant: Joyfilly Limited, Wellington (NZ)

(72) Inventor: William Robert Wiles, Wellington (NZ)

(73) Assignee: Joyfilly Limited, Wellington (NZ)

( * ) Notice: Subject to any disclaimer, the term of this patent is extended or adjusted under 35 U.S.C. 154(b) by 1024 days.

(21) Appl. No.: 17/782,319

(22) PCT Filed: Dec. 1, 2020

(86) PCT No.: PCT/NZ2020/050160
§ 371 (c)(1),
(2) Date: Jun. 3, 2022

(87) PCT Pub. No.: WO2021/112690
PCT Pub. Date: Jun. 10, 2021

(65) Prior Publication Data

US 2023/0000717 A1 Jan. 5, 2023

Related U.S. Application Data

(60) Provisional application No. 62/943,468, filed on Dec. 4, 2019.

(51) Int. Cl.
*A61H 23/02* (2006.01)
*A61C 17/34* (2006.01)
*A61H 19/00* (2006.01)

(52) U.S. Cl.
CPC ......... *A61H 23/02* (2013.01); *A61C 17/3481* (2013.01); *A61H 19/34* (2013.01);
(Continued)

(58) Field of Classification Search
CPC ...... A61H 13/00–005; A61H 19/00–50; A61H 23/02; A61H 23/0236–0263;
(Continued)

(56) References Cited

U.S. PATENT DOCUMENTS 2,263,219 A 11/1941 Lybarger
2,729,442 A 1/1956 Neidhart
(Continued)

FOREIGN PATENT DOCUMENTS

CN 107693150 A * 2/2018 ........... A61C 17/221
GB 2375050 A * 11/2002 ............. A61H 19/00
(Continued)

OTHER PUBLICATIONS

Translation of CN 107693150. (Year: 2018).*
(Continued)

*Primary Examiner* — Paige Kathleen Bugg
(74) *Attorney, Agent, or Firm* — ArentFox Schiff LLP; Joseph M. Maraia

(57) ABSTRACT

A massage accessory for use with an electric toothbrush has a body and a coupling mechanism. The electric toothbrush has a body, and a shaft configured to generate an oscillating movement. The coupling mechanism is configured to couple the massage accessory to the shaft of the electric toothbrush. The body of the accessory has a base at a proximal end of the body, a head at or near a distal end of the body, and a flexible region between the base and the head. The base, the head, and the flexible region are arranged such that the head is configured to move in response to the oscillating movement of the shaft and the base remains relatively stationary compared to the body of the electric toothbrush. A massage accessory for use with an electric toothbrush has a transfer shaft with a driving feature, and a coupling mechanism configured to couple the massage accessory to the shaft of the electric toothbrush. The accessory has a head having a driving feature that is complementary to the driving feature of the transfer shaft. A space is provided between the driving feature of the transfer shaft and the driving feature of the head when the transfer shaft and head are engaged such that
(Continued)

oscillating movement of the transfer shaft causes a corresponding oscillating movement of the head and additionally causes vibration of the head.

20 Claims, 9 Drawing Sheets

(52) U.S. Cl.
CPC ................ *A61H 2201/0153* (2013.01); *A61H 2201/1685* (2013.01)

(58) Field of Classification Search
CPC .. A61C 15/047–048; A61C 17/22–227; A61C 17/26; A61C 17/32; A61C 17/3418; A61C 17/3481
USPC ................. 601/18, 138, 46, 53, 85, 89, 139, 601/162–164
See application file for complete search history.

(56) References Cited

U.S. PATENT DOCUMENTS

| | | | | | |
|---|---|---|---|---|---|
| 3,400,417 | A | 9/1968 | Moret | | |
| 3,424,150 | A | 1/1969 | Meranto | | |
| 3,441,016 | A | 4/1969 | Kanbar | | |
| 3,504,665 | A | 4/1970 | Bakunin et al. | | |
| 5,033,150 | A * | 7/1991 | Gross | A61C 17/40 | 15/22.1 |
| 5,579,786 | A * | 12/1996 | Wolk | A61C 15/047 | 433/118 |
| 6,948,209 | B2 * | 9/2005 | Chan | A46B 9/026 | 15/28 |
| 7,186,226 | B2 * | 3/2007 | Woolley | A61H 19/34 | 601/138 |
| 9,468,511 | B2 | 10/2016 | Garrigues et al. | | |
| 10,028,883 | B2 | 7/2018 | Yenko et al. | | |
| 2005/0000043 | A1 * | 1/2005 | Chan | A46B 15/0075 | 601/142 |
| 2005/0020943 | A1 * | 1/2005 | Friedland | A61H 7/003 | 601/1 |
| 2005/0273024 | A1 * | 12/2005 | Nan | A61H 19/44 | 600/38 |
| 2007/0244418 | A1 | 10/2007 | Harkness | | |
| 2008/0255483 | A1 * | 10/2008 | Goldberg | A61H 7/005 | 604/116 |
| 2010/0269275 | A1 | 10/2010 | Shimoyama et al. | | |
| 2013/0123675 | A1 * | 5/2013 | Oki | A61H 23/0254 | 601/112 |
| 2014/0357944 | A1 * | 12/2014 | Spietz | A61H 19/40 | 600/38 |
| 2015/0119636 | A1 | 4/2015 | Yenko et al. | | |
| 2015/0327965 | A1 * | 11/2015 | Garrigues | A61C 17/3418 | 74/25 |
| 2018/0296309 | A1 * | 10/2018 | Yoshida | A46B 5/0095 | |
| 2019/0357665 | A1 * | 11/2019 | Booker | A46B 15/0075 | |
| 2020/0138673 | A1 * | 5/2020 | Vargo | A61H 13/00 | |
| 2020/0230018 | A1 * | 7/2020 | Nishimura | A61H 23/0245 | |
| 2020/0237608 | A1 * | 7/2020 | Martell | A61H 23/00 | |

FOREIGN PATENT DOCUMENTS

| | | | | |
|---|---|---|---|---|
| KR | 102180123 | | 11/2020 | |
| NL | 1030139 | C2 * | 4/2007 | A61H 19/44 |

OTHER PUBLICATIONS

Translation of NL 1030139. (Year: 2007).*
https://www.fruugo.co.nz/rechargeable-electric-toothbrush-three-in-one-electric-toothbrush-for-brushing-teeth-washing-face-and-facial-massage/p-54665350-111198009.
https://www.alibaba.com/product-detail/3-in-1-Electric-Brush-for_1600125582444.html.
International Preliminary Report on Patentability mailed Mar. 28, 2022, for related App. No. PCT/NZ2020/050160, 8 pages.

* cited by examiner

MASSAGE ATTACHMENT FOR USE WITH AN ELECTRIC TOOTHBRUSH

CROSS-REFERENCE TO RELATED APPLICATIONS

This application is the U.S. national phase entry under 35 U.S.C. § 371 of International Application No. PCT/NZ2020/050160, filed Dec. 1, 2020, entitled A MASSAGE ATTACHMENT FOR USE WITH AN ELECTRIC TOOTHBRUSH, which in turn claims priority to and benefit of U.S. Provisional Application No. 62/943,468, filed Dec. 4, 2019, the contents of which are incorporated herein by reference in their entirety for all purposes.

FIELD OF THE INVENTION

This invention relates to a massage attachment for use with an electric toothbrush.

BACKGROUND

A common type of electric toothbrush is an oscillating toothbrush. Oscillating toothbrushes have a handle that houses an electric motor, and a shaft extending from the handle that oscillates at relatively high frequencies at around 2,500 to 10,500 strokes per minute. A toothbrush attachment having a shaft and a movable head is connected to the electric toothbrush shaft, and a mechanism within the toothbrush attachment translates the oscillating motion of the toothbrush shaft into an oscillating rotating motion of the toothbrush attachment head, which is usually set at a right-angle to the shaft. Modern oscillating toothbrushes are designed to minimise vibration of the toothbrush attachment, such that the attachment shaft is relatively stationary compared with the toothbrush handle. The attachment head with the bristles oscillates at right angles relative to the attachment shaft and handle.

Another type of electric toothbrush is a vibrating electric toothbrush, which are often referred to as sonic toothbrushes. These sonic toothbrushes typically vibrate at a much higher frequency than the oscillations of oscillating toothbrushes at around 20,000 to 30,000 strokes per minute. Toothbrush attachments for sonic toothbrushes do not have a separate moving head, and the entire toothbrush attachment vibrates.

Various attachments are known for adapting electric toothbrushes for purposes other than cleaning teeth, such as sexual stimulation and/or massage. These attachments generally translate the motion of the toothbrush (either oscillation or vibration) into the same type of motion of the attachment.

U.S. Pat. No. 10,028,883 discloses a sexual pleasure device that comprises a sleeve that is removably installable on a toothbrush having a source of vibration. A sleeve attachment may be relatively ineffective when used with an oscillating toothbrush.

In another example, a relatively rigid head is positioned directly on the toothbrush shaft. The motion of the shaft (either oscillation or vibration) is translated directly to the rigid head to provide an oscillating or vibrating device (depending on the type of toothbrush). The movement of a rigid attachment may be too harsh for the attachment to be used directly on a user's skin, especially when used with an oscillating toothbrush.

U.S. Pat. No. 7,186,226 and US 2008/0221387 disclose massage attachments for electric toothbrushes with similar mechanisms to an oscillating toothbrush attachment. The attachments have oscillating heads with a textured or smooth surface instead of bristles. This type of attachment can only be used with an oscillating toothbrush, and the attachment does not vibrate significantly when used with a modern electric toothbrush. The attachment head oscillates through a narrow arc (similar to an oscillating toothbrush head), which may not be an optimal movement for providing sexual stimulation.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide an electric toothbrush attachment that overcomes at least some of the problems described above, and/or to at least provide the public with a useful alternative.

SUMMARY OF THE INVENTION

In accordance with a first aspect of the invention, there is provided a massage accessory for use with an electric toothbrush, the electric toothbrush having a body, and a shaft configured to generate an oscillating movement, the accessory comprising: a body having a base at a proximal end of the body, a head at or near a distal end of the body, and a flexible region between the base and the head; and a coupling mechanism configured to couple the massage accessory to the shaft of the electric toothbrush; wherein the base, the head, and the flexible region are arranged such that the head is configured to move in response to the oscillating movement of the shaft and the base remains relatively stationary compared to the body of the electric toothbrush.

In an embodiment, the flexible region is configured to flex as the head moves.

In an embodiment, the base is rigid compared to the flexible region. In an embodiment, the head is rigid compared to the flexible region.

In an embodiment, the head is configured to oscillate in response to the oscillating movement of the shaft. In an embodiment, the shaft of the electric toothbrush is configured to oscillate back and forth along a semi-circular path and the head is configured to oscillate back and forth along a corresponding semi-circular path.

In an embodiment, the head is configured to vibrate in response to the oscillating movement of the shaft.

In an embodiment, the massage accessory further comprises a transfer shaft configured to transmit movement from the shaft of the electric toothbrush to the head. In an embodiment, the transfer shaft has a cavity configured to receive the shaft of the electric toothbrush.

In an embodiment, the coupling mechanism comprises a clip configured to engage the shaft of the electric toothbrush. In an embodiment, the clip comprises a resiliently deformable finger. In an embodiment, the clip comprises a protrusion configured to engage a surface of the shaft of the electric toothbrush.

In an embodiment, the flexible region is overmoulded or co-moulded with the head.

In an embodiment, the body further comprises a sleeve extending from the proximal end of the body and spaced apart from the head. In an embodiment, the flexible region is overmoulded or co-moulded with the sleeve.

In an embodiment, the massage accessory further comprises a biasing mechanism configured to bias the head towards a neutral position. In an embodiment, the flexible region is, or comprises, the biasing mechanism.

In an embodiment, the head has a massaging feature. In an embodiment, the massaging feature is a protrusion.

In an embodiment, at least a portion of the exterior of the head comprises a soft material.

In accordance with a second aspect of the invention, there is provided a massage accessory for use with an electric toothbrush, the electric toothbrush having a body, and a shaft configured to generate an oscillating movement, the accessory comprising: a transfer shaft having a driving feature, and a coupling mechanism configured to couple the massage accessory to the shaft of the electric toothbrush; and a head having a driving feature that is complementary to the driving feature of the transfer shaft; wherein a space is provided between the driving feature of the transfer shaft and the driving feature of the head when the transfer shaft and head are engaged such that oscillating movement of the transfer shaft causes a corresponding oscillating movement of the head and additionally causes vibration of the head.

In an embodiment, the driving feature of the transfer shaft is a protrusion and the driving feature of the head is a recess. In an embodiment, the protrusion has at least one edge that is configured to strike a surface of the recess when the transfer shaft oscillates. In an embodiment, the transfer shaft has a substantially quadrilateral cross-section.

In an embodiment, the shaft of the electric toothbrush is configured to oscillate back and forth along a semi-circular path and the head is configured to oscillate back and forth along a corresponding semi-circular path.

In an embodiment, the transfer shaft has a cavity configured to receive the shaft of the electric toothbrush. In an embodiment, the coupling mechanism comprises a clip configured to engage the shaft of the electric toothbrush. In an embodiment, the clip comprises a resiliently deformable finger. In an embodiment, the clip comprises a protrusion configured to engage a surface of the shaft of the electric toothbrush.

In an embodiment, the massage accessory further comprises a biasing mechanism configured to bias the head towards a neutral position.

In an embodiment, the massage accessory further comprises a body having a base at a proximal end of the body, the head at or near a distal end of the body, and a flexible region between the base and the head.

In an embodiment, the flexible region is or comprises the biasing mechanism.

In an embodiment, the flexible region is overmoulded or co-moulded with the head.

In an embodiment, the body further comprises a sleeve extending from the proximal end of the body and spaced apart from the head.

In an embodiment, the flexible region is overmoulded or co-moulded with the sleeve.

In an embodiment, the massage accessory further comprises a body having a base at a proximal end of the body, the head at or near a distal end of the body, and a rotatable connection between the base and the head.

In an embodiment, the rotatable connection is overmoulded or co-moulded with the head.

In an embodiment, the body further comprises a sleeve extending from the proximal end of the body and spaced apart from the head.

In an embodiment, the rotatable connection is rotatably connected with the sleeve.

In an embodiment, the rotatable connection comprises a flexible region.

In accordance with a third aspect of the invention, there is provided a combination of an electric toothbrush and the accessory of the first aspect or the second aspect.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

Figure 1:
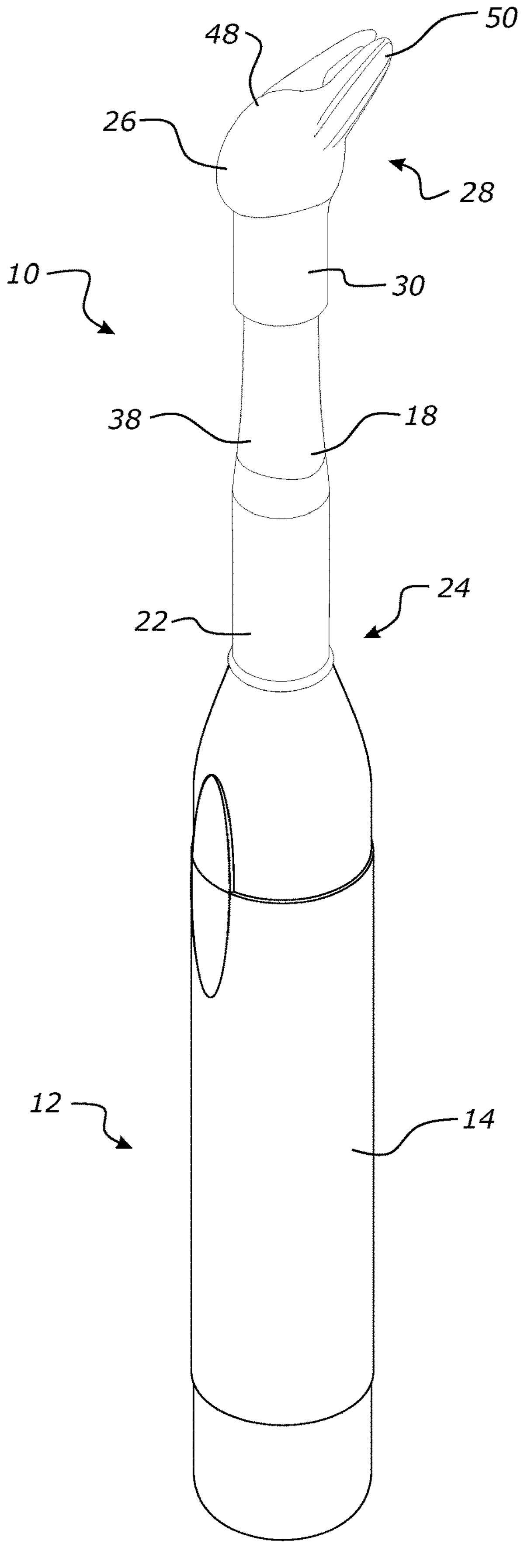
FIG. 1 shows a perspective view of a massage accessory connected to an electric toothbrush.
Figure 2:
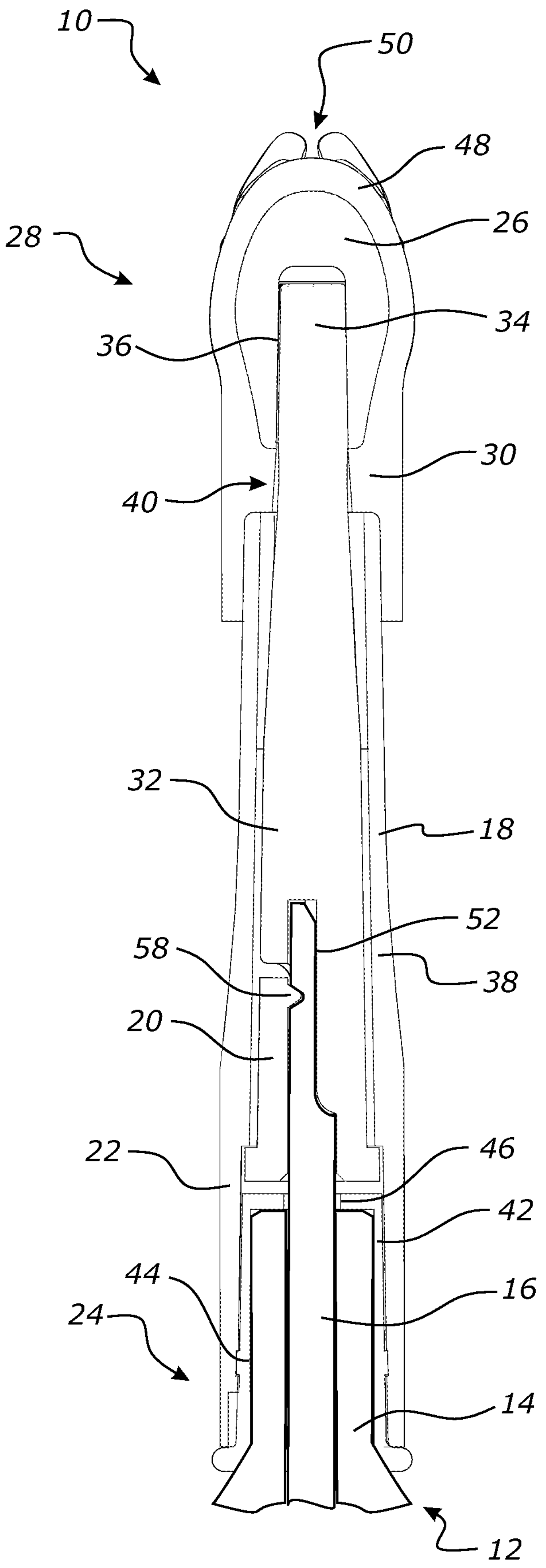
FIG. 2 shows a longitudinal cross-sectional view of the massage accessory.

FIG. 1 and FIG. 2 show a massage accessory 10 for use with an electric toothbrush 12. The electric toothbrush 12 has a body 14, and a shaft 16 configured to generate an oscillating movement. The massage accessory 10 has a body 18 and a coupling mechanism 20. The coupling mechanism 20 is configured to couple the massage accessory 10 to the shaft 16 of the electric toothbrush 12.

The massage accessory 10 is suitable for use with an oscillating electric toothbrush.

The body 18 of the accessory 10 has a base 22 at a proximal end 24 of the body 18, a head 26 at or near a distal end 28 of the body 18, and a flexible region 30 between the base 22 and the head 26.

The base 22, the head 26, and the flexible region 30 are arranged such that the head 26 is configured to move in response to the oscillating movement of the shaft 16 of the electric toothbrush 12, and the base 22 remains relatively stationary compared to the body 14 of the electric toothbrush 12.

The accessory 10 has a transfer shaft 32. The transfer shaft 32 has a driving feature 34, and the coupling mechanism 20 configured to couple the massage accessory 10 to the shaft 16 of the electric toothbrush 12. The head 26 has a driving feature 36 that is complementary to the driving feature 34 of the transfer shaft 32.

The accessory 10 shown may be used for sexual stimulation. In alternative embodiments, the accessory 10 may be used for other applications, such as muscle massage, pressure point massage, gum massage, and stool loosening.

In the embodiment shown, the body 18 fully surrounds the shaft 16 of the toothbrush and the transfer shaft 32. This enables the accessory to be used for both external and internal stimulation. The accessory 10 is formed from waterproof materials, enabling the accessory 10 to be used underwater.

In the embodiment shown, the body 18 of the accessory 10 has a sleeve 38 extending from the proximal end 24 of the body 18 and spaced apart from the head 26, such that there is a gap 40 between the sleeve 38 and the head 26. The sleeve 38 substantially surrounds the transfer shaft 32. The sleeve 38 remains relatively stationary compared to the body 14 of the electric toothbrush 12 when the shaft 16 of the toothbrush oscillates.

A plug 42 is located substantially within the sleeve 38 at the proximal end 24 of the body 18. The plug 42 in combination with a portion of the sleeve 38 form the base 22 of the body 14. The plug 42 has a cavity 44 that is configured to engage with a portion of the body 14 of the electric toothbrush 12. The plug has an opening 46 that is larger than a transverse dimension of the toothbrush shaft 16, such that the toothbrush shaft 16 can freely oscillate within the opening 46.

In the embodiment shown, the sleeve 38 and the plug 42 are separate components. In an embodiment, the plug 42 is configured to irreversibly engage with the sleeve 38 when the plug 42 is assembled with the sleeve 38. In alternative embodiments, the sleeve 38 and the plug 42 may be integrally formed.

In the embodiment shown, the sleeve 38 has a similar shape to a standard electric toothbrush head. This may help to provide an accessory 10 that resembles a toothbrush head, such that the purpose of the accessory 10 is not obvious. In alternative embodiments, the sleeve 38 may have any suitable shape.

The flexible region 30 is connected to the sleeve 38 and the head 26, and covers the gap 40 between the sleeve 38 and the head 26. The flexible region 30 is configured to flex as the head 26 moves. For example, the flexible region 30 is configured to flex as the head 26 oscillates as it is driven by the oscillating motion of the toothbrush shaft 16 transferred to the head 26 through the transfer shaft 32.

In an embodiment, the sleeve 38 is rigid compared to the flexible region 30. In an embodiment, the base 22 is rigid compared to the flexible region 30. In an embodiment, the head 26 is rigid compared to the flexible region 30. In the embodiment shown, the sleeve 38, base 22 and head 26 are formed from a rigid material compared to the material used to form the flexible region 30.

In an alternative embodiment, a substantial portion of the head 26 is formed from a flexible material. In an embodiment, substantially the entire head 26 is formed from a flexible material.

The rigid components of the accessory 10 are formed from a suitable rigid material, such as a rigid polymeric material. An exemplary material is polyoxymethylene (POM). However, any other suitable materials may be used.

In the embodiment shown, the flexible region 30 is formed from silicone or a suitable elastomeric material such as a rubber-like polymer.

In an embodiment, the flexible region 30 is overmoulded or co-moulded with the head 26. In an embodiment, the flexible region 30 is overmoulded or co-moulded with the sleeve 38.

Figure 5:
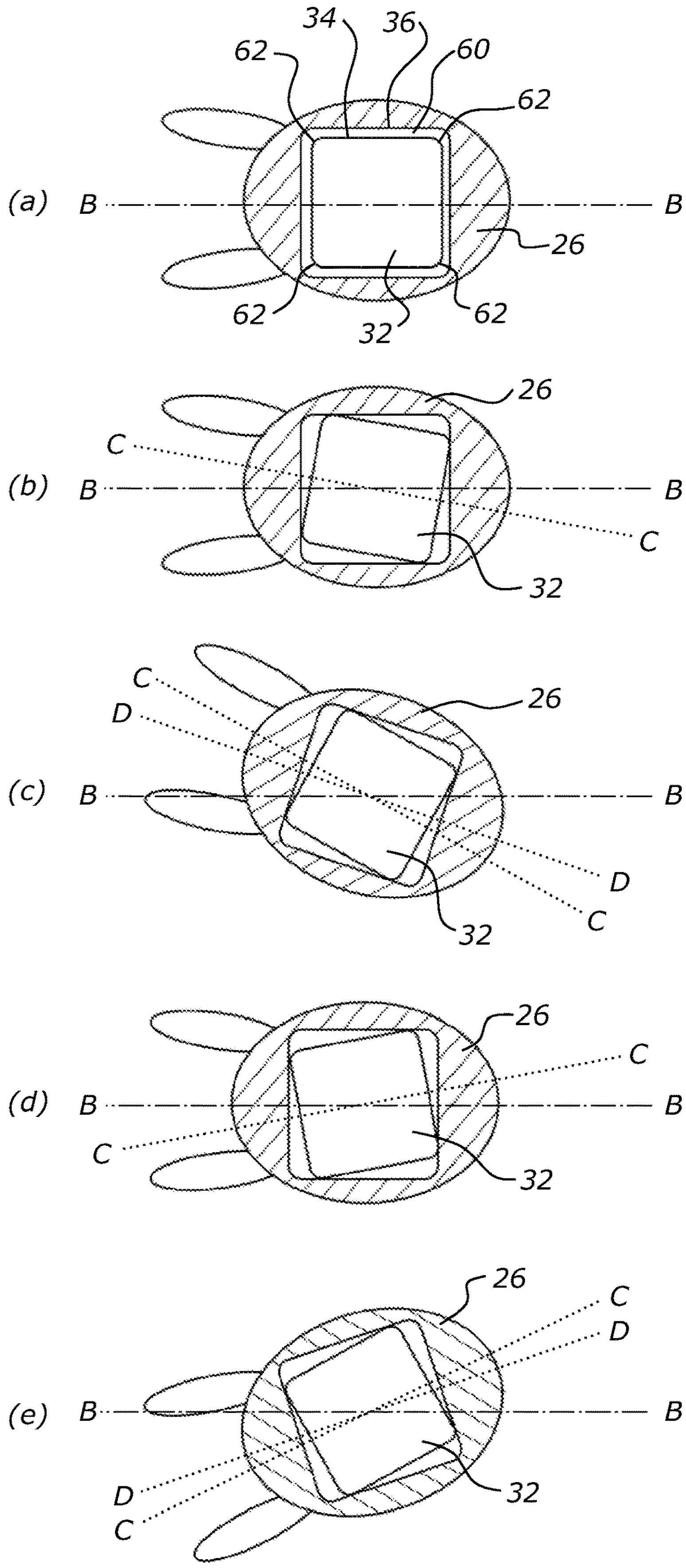
FIG. 5 shows a cross-sectional view taken through the head of the massage accessory at various points during the oscillation of the toothbrush shaft.

In an embodiment, the massage accessory has a biasing mechanism configured to bias the head 26 towards a neutral position. In the embodiment shown, the neutral position is at about the mid-point of the semi-circular oscillation path of the head 26, as shown in FIG. 5*a*.

In an embodiment, the flexible region 30 is the biasing mechanism. In alternative embodiments, the flexible region 30 comprises the biasing mechanism. In the embodiment shown, the flexible region 30 is formed from a relatively elastic and/or resilient material. When the head 26 is rotated away from the neutral position, the flexible region 30 resiliently deforms. The elasticity and/or resiliency of the material provides a restoring force to bias the head 26 towards the neutral position.

In alternative embodiments, a separate biasing mechanism may be used to provide a restoring force to bias the head 26 towards a neutral position. For example, any suitable spring mechanism could be used. Various types of springs such as torsion springs, tension springs and compression springs could be used to provide the restoring force. Alternatively, an elastomeric component could be used to provide the restoring force.

In an embodiment, the restoring force becomes greater as the head 26 is rotated further away from the neutral position.

Biasing the head 26 towards a neutral position may help to provide a smooth oscillation path. Biasing the head 26 towards a neutral position may contribute to the effectiveness of the vibration mechanism (described in more detail below).

In some embodiments, the massage accessory does not have biasing mechanism.

In an embodiment, at least a portion of the exterior of the head 26 comprises a soft material, such as silicone or a suitable elastomeric material such as a rubber-like polymer. In the embodiment shown in FIGS. 1 and 2, the head 26 has a cover 48. In the embodiment shown, the cover 48 is integrally formed with the flexible region 30. In an embodiment, the cover 48 and the flexible region 30 are made from the same material. In an alternative embodiment, the cover 48 is a separate part. In an embodiment, the cover 48 is integrally formed with the head 26. In an embodiment, the flexible region 30 is integrally formed with the distal end of the sleeve 38.

Figure 3:
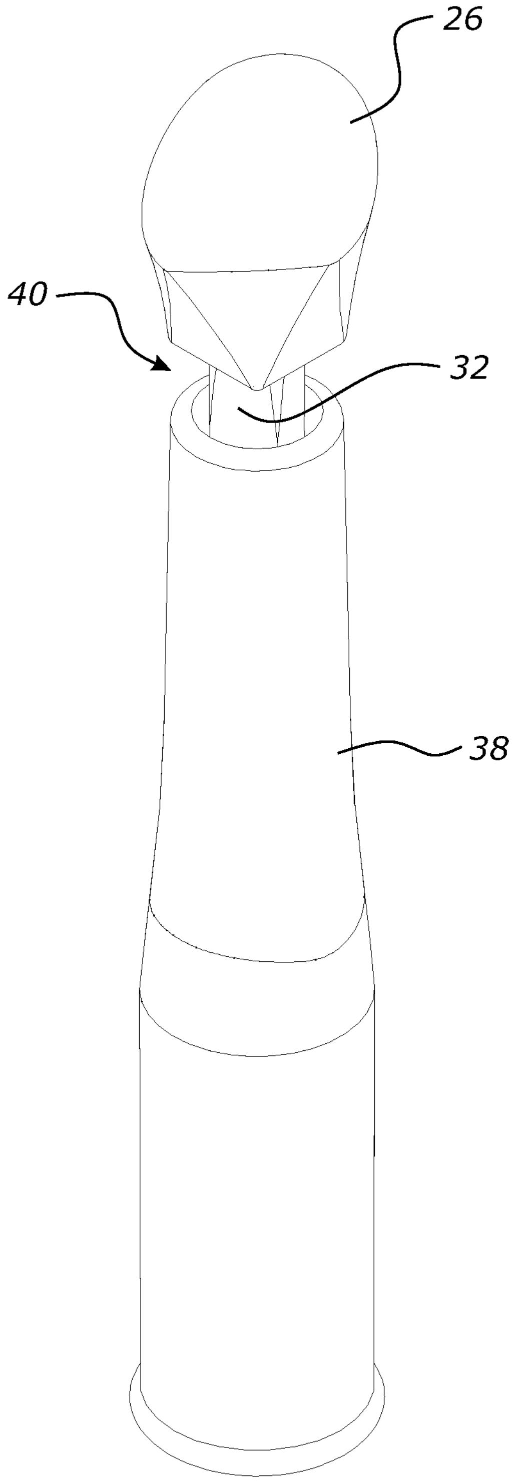
FIG. 3 shows a perspective view of the massage accessory with the flexible region and the cover removed.

FIG. 3 shows the accessory 10 with flexible region 30 and the cover 48 removed for clarity. The head 26 has a substantially smooth, elliptical shape. This shape may be suitable for various types of massage. In alternative embodiments, the head 26 may have any other suitable shape.

In some embodiments, the head 26 has a massaging feature 50. In some embodiments, the massaging feature 50 is a protrusion. There may be a single protrusion or a plurality of protrusions. In the embodiment shown in FIGS. 1 and 2 the massaging feature 50 comprises protruding 'rabbit ears'. The rabbit ears are shaped for providing sexual stimulation.

In some embodiments, the massaging feature 50 is a textured surface of the head 26, for example a ribbed texture, or a texture with a plurality of raised portions.

The head 26 may have any other suitable massaging features. FIGS. 7A, 7B and 9A-F show alternative embodiments of heads 26 with different massaging features.

The head 26 may have any suitable shape, colour, pattern, or texture. For example, the head may be shaped to represent an animal, a human head, a cartoon character, or an emoji. The head 26 may be shaped and/or textured to accentuate the vibration and/or oscillation action of the accessory 10. The head 26 may be shaped to provide stimulation for a particular area of the body. A user may have several accessories 10 with different heads 26 for providing different types of stimulation.

Figure 7A:
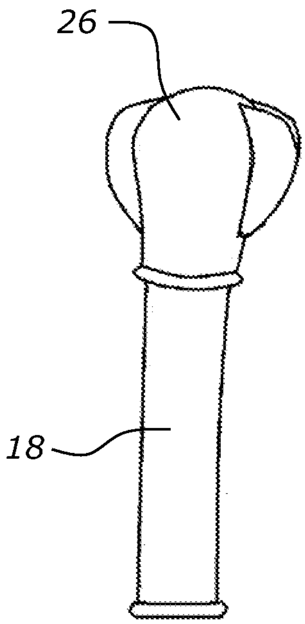
FIGS. 7A-7B show alternative embodiments of a massage accessory head.
Figure 7B:
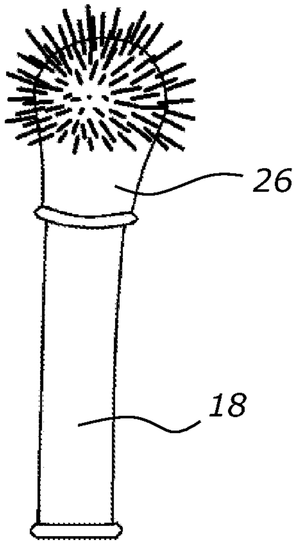

FIGS. 7A and 7B show alternative embodiments of heads 26 for providing sexual stimulation.

FIGS. 9A-9F show further alternative embodiments for a head 26.

Figure 9A:
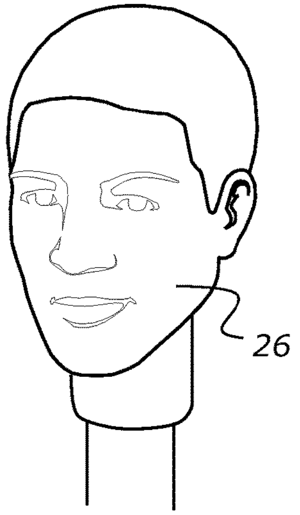
FIGS. 9A-9F show further alternative embodiments of a massage accessory head.

FIG. 9A shows a head 26 that is shaped to resemble a human head. The human head may resemble a celebrity.

Figure 9B:
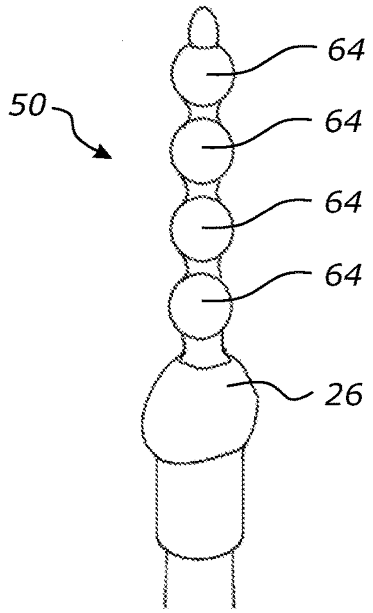

FIG. 9B shows a head 26 with a massaging feature 50 comprising a plurality of spaced apart beads/round protrusions 64. The beads 64 may be formed from a medium-hard elastomer. The beads 64 may be suitable for providing anal stimulation.

Figure 9C:
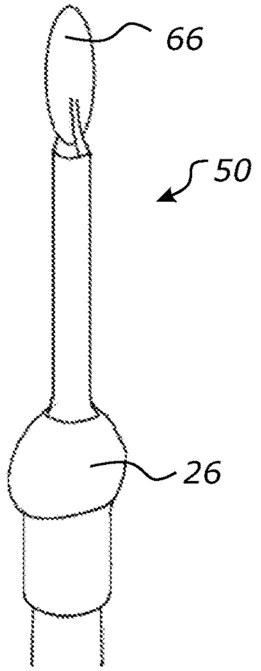

FIG. 9C shows a head 26 with a massaging feature 50 comprising a spoon-shaped protrusion 66. The massaging feature 50 may be formed from a hard, rubber-like elastomer. The spoon-shaped protrusion 66 may be suitable for loosening stools.

Figure 9D:
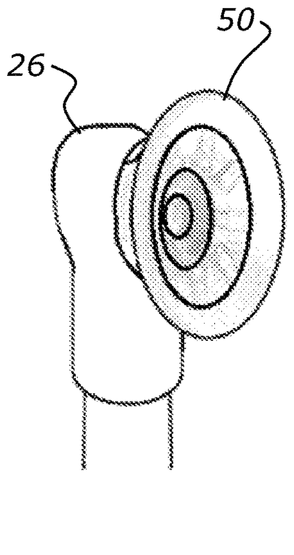

FIG. 9D shows a head 26 with a massaging feature 50 that is shaped like a suction cup for massaging the clitoris or penis.

Figure 9E:
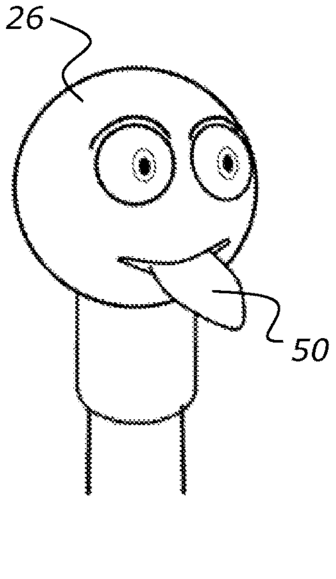

FIG. 9E shows a head 26 that is shaped to resemble an emoji. The head 26 has a massaging feature 50 that is shaped to resemble a tongue of the emoji to provide sexual stimulation.

Figure 9F:
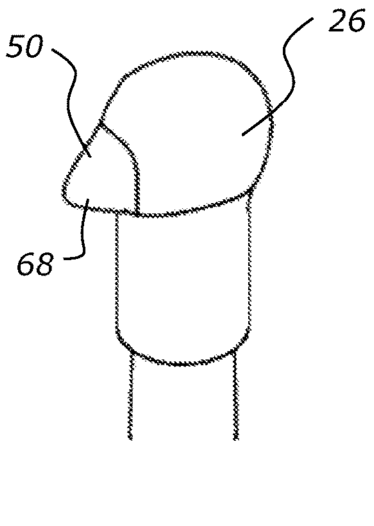

FIG. 9F shows a head 26 with a massaging feature 50 comprising a tapering protrusion that tapers to a rounded point 68. The tapering protrusion may be formed from a medium-hard elastomer. The rounded point 68 may be suitable for pressure point massage.

Figure 6:
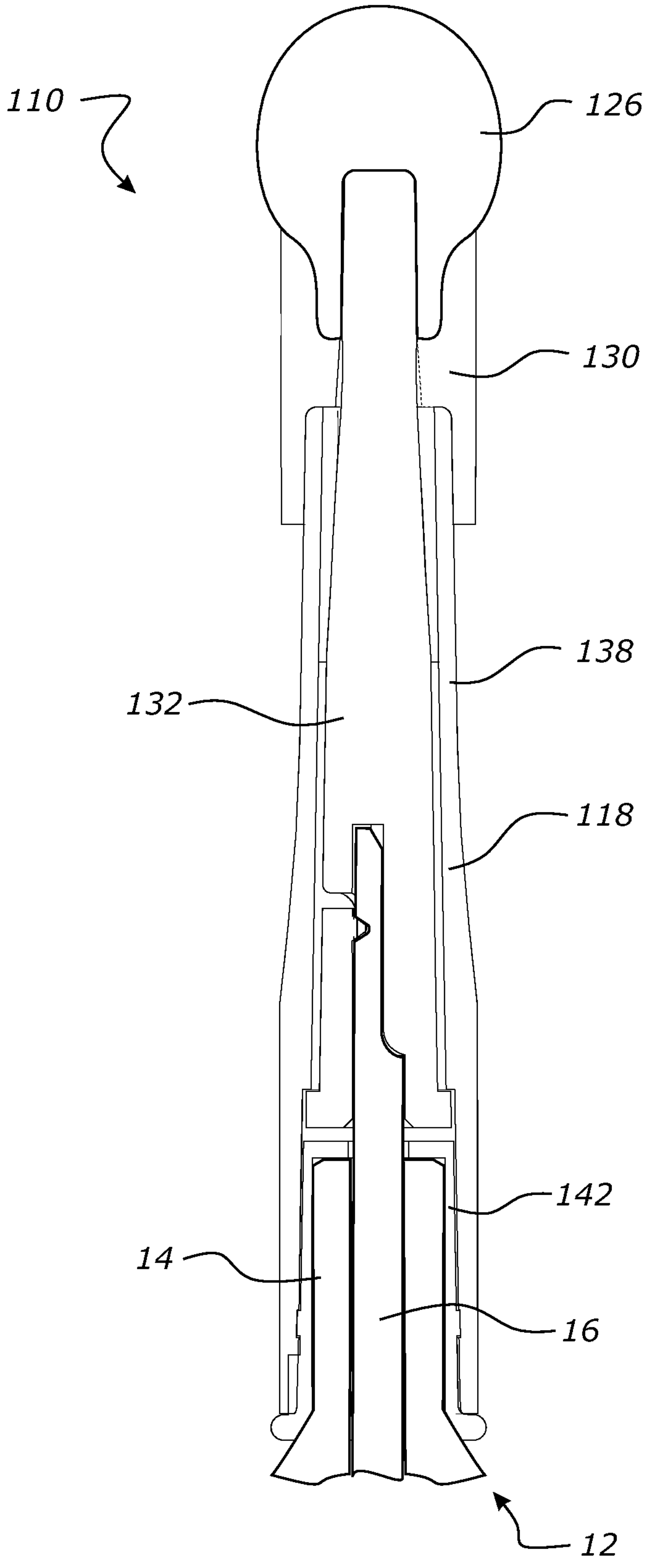
FIG. 6 shows an alternative embodiment of a massage accessory.

FIG. 6 shows an alternative embodiment massage accessory 110, where the head 126 does not have a cover integrally formed with the flexible region 130. Unless otherwise described, the alternative embodiment massage accessory 110 has the same features and functionality as the massage accessory 10 shown in FIGS. 1 to 5. Like numbers indicate like parts, with the addition of 100. In an embodiment, the massage accessory 110 may be used without a cover.

Figure 8A:
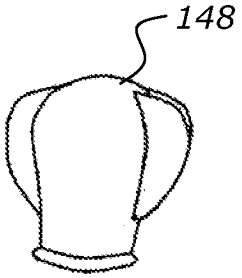
FIGS. 8A-8B show alternative embodiments of a removable cover for a massage accessory head.
Figure 8B:
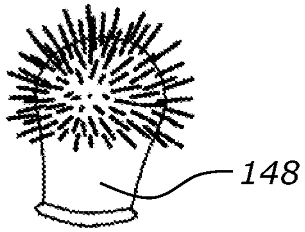

In an embodiment, the massage accessory 110 has a removable cover 148. The cover 148 is removable from the head 126, such that different covers 148 may be used with the massage accessory to provide different types of stimulation. FIGS. 8A and 8B show examples of alternative designs for a removable cover 148 with similar features to the head 26 of FIGS. 7A and 7B respectively.

In this embodiment, the removable cover 148 is made from a suitable flexible material that can be stretched over the head 126. The elliptical shape of the head 126 holds the removable cover 148 in place during use.

Any of the alternative head 26 designs of FIGS. 9A-F described above may also be configured as removable covers 148.

The transfer shaft 32 is configured to transmit movement from the shaft 16 of the electric toothbrush 12 to the head 26 of the accessory 10. Referring to FIG. 2, the transfer shaft 32 has a cavity 52 configured to receive the shaft 16 of the electric toothbrush 12.

Figure 4:
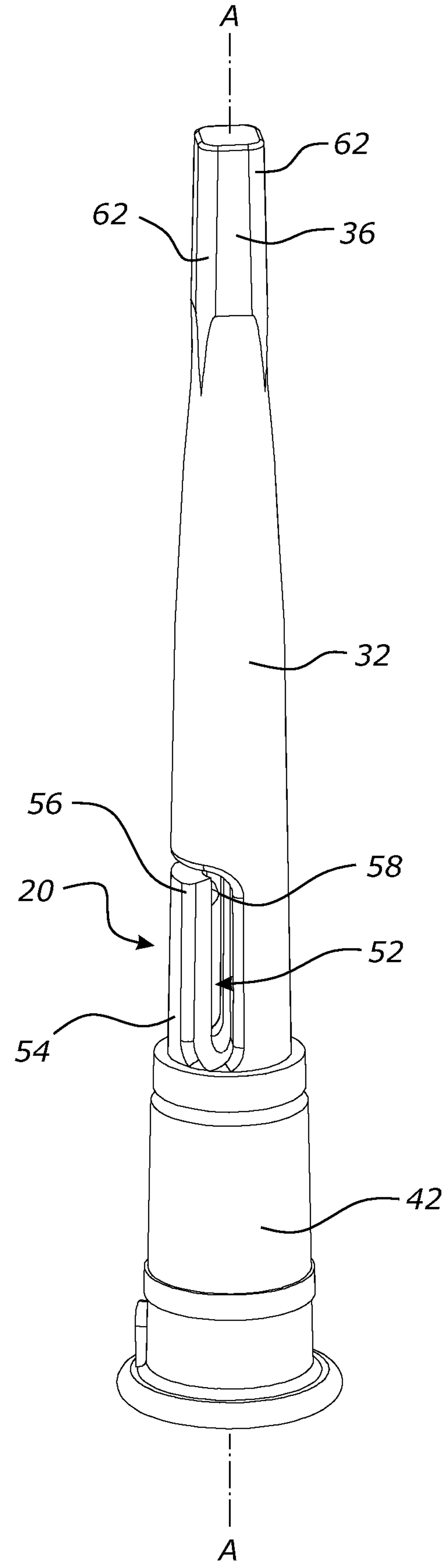
FIG. 4 shows a perspective view of the base and shaft of the massage accessory.

FIG. 4 shows the transfer shaft 32 and the plug 42, with the other components of the accessory 10 removed for clarity.

The coupling mechanism 20 has a clip 54 configured to engage the shaft 16 of the electric toothbrush 12. The clip 54 has a resiliently deformable finger 56. The clip 54 has a protrusion 58 configured to engage a surface of the shaft 16 of the electric toothbrush 12. The protrusion 58 extends from the resiliently deformable finger 56.

In alternative embodiments, the coupling mechanism 20 may have different forms. For example, the coupling mechanism 20 could be configured to engage the shaft 16 via a friction fit. The coupling mechanism 20 could include a magnet that engages with the shaft 16. The coupling mechanism 20 could have a locking mechanism that engages with the shaft 16, and a button that disengages the locking mechanism when pressed by a user. The coupling mechanism 20 may be adapted to engage with a specific shaft 16 design of a commercially available electric toothbrush 12.

The head 26 is configured to oscillate in response to the oscillating movement of the toothbrush shaft 16. The shaft 16 of the electric toothbrush 12 is configured to oscillate back and forth along a semi-circular path and the head 26 is configured to oscillate back and forth along a corresponding semi-circular path. The toothbrush shaft 16 and the transfer shaft 32 oscillate about a common axis A-A, as referenced in FIG. 4. The axis A-A defines the centre of rotation of the semi-circular path.

In a preferred embodiment, the head 26 is configured to vibrate in response to the oscillating movement of the shaft 16 of the electric toothbrush 12.

FIGS. 5*a*-5*e* show schematic cross-sectional views of the accessory head 10 and transfer shaft 32 during oscillation of the transfer shaft 32.

In the embodiment shown in FIGS. 5*a*-5*e*, a space 60 is provided between the driving feature 34 of the transfer shaft 32 and the driving feature 36 of the head 26 when the transfer shaft 32 and head 26 are engaged, such that oscillating movement of the transfer shaft 32 causes a corresponding oscillating movement of the head 26 and additionally causes vibration of the head 26. Altering the relative sizes of the driving features 34, 36 to change the size of the space 60 changes the mix and intensity of the vibration and oscillation of the head 26. A smaller space 60 results in a greater angle of oscillation and less vibration. A larger space 60 results in a smaller angle of oscillation and more vibration.

In a preferred embodiment, the space 60 is set to deliver a maximum angle of oscillation of the head 26 along the axis D-D that is 10° less than the maximum angle of oscillation of the transfer shaft 32 along the axis C-C, where both angles are measured relative to the neutral axis B-B. A common type of electric oscillating toothbrush has a shaft that oscillates through a total angle of around 70 degrees i.e. 35 degrees on either side of the neutral axis B-B. In the embodiment shown, the driving feature 34 of the transfer shaft 32 is a protrusion and the driving feature 36 of the head 26 is a recess. In an alternative embodiment, the driving feature 34 of the transfer shaft 32 is a recess and the driving feature 36 of the head 26 is a protrusion. In an embodiment, the driving features 34, 36 are tapered in the direction of the distal end of the body 14.

The protrusion has at least one edge that is configured to strike a surface of the recess when the transfer shaft oscillates. In the embodiment shown, the driving feature 34 of the transfer shaft 32 has a substantially quadrilateral cross-section, which has four edges 62 configured to strike a surface of the recessed driving feature 36 of the head 26. In the embodiment shown, the quadrilateral cross-section is a square.

In the embodiment shown, the edges 62 are rounded. The protruding driving feature 34 and corresponding recessed driving feature 36 may have any other suitable cross-section that provides a three-dimensional shape with at least one edge, such as a tear-drop shape (one edge), an eye shape (two edges), a triangular shape (three edges), a diamond shape (four edges), a rectangular shape (four edges), a star shape (four or more edges), or any other suitable polygonal shape (five or more edges).

FIG. 5*a* shows the transfer shaft 32 in a neutral position at the mid-point of the semi-circular oscillation path. Transverse centrelines of the head 26 and the transfer shaft 32 are both aligned with a neutral axis B-B. In the neutral position, the driving feature 34 of the transfer shaft 32 does not engage with the driving feature 36 of the head 26, due to the space 60 between the driving features 34, 36.

The transfer shaft 32 rotates in a first direction through a portion of the semi-circular path without the driving feature 34 of the transfer shaft 32 engaging the driving feature 36 of the head 26. FIG. 5*b* shows the transfer shaft 32 when it has rotated just far enough in the first direction for the driving feature 34 of the transfer shaft 32 to strike the driving feature 36 of the head 26. The striking action causes the head 26 to vibrate while the head 26 is in a relatively neutral position. When the striking action occurs, the transverse centreline C-C of the transfer shaft 32 is angularly offset from the neutral axis B-B, and the transfer centreline of the head 26 is aligned with the neutral axis B-B.

The transfer shaft 32 continues to rotate in the first direction, causing the head 26 to rotate in the first direction. FIG. 5*c* shows the transfer shaft 32 at the maximum angle of rotation in the first direction. The maximum angle of rotation of the transfer shaft 32 in the first direction may be about 30°-35° from the neutral axis B-B. In this position the transverse centreline D-D of the head 26 is angularly offset from the neutral axis B-B, but by a smaller angle than the transverse centreline C-C of the transfer shaft 32. The maximum angle of rotation of the head 26 in the first direction may be about 20°-25° from the neutral axis B-B. In a preferred embodiment, when the transfer shaft 32 is at the maximum angle of rotation in the first direction, the transverse centreline C-C of the transfer shaft 32 is offset from the neutral axis B-B by about 35° and the transverse centreline D-D of the head 26 is offset from the neutral axis B-B by about 25°.

The transfer shaft 32 then rotates in a second direction back to the neutral position as shown in FIG. 5*a*, and continues to rotate in the second direction through a portion of the semi-circular path without the driving feature 34 of the transfer shaft 32 engaging the driving feature 36 of the head 26. FIG. 5*d* shows the transfer shaft 32 when it has rotated just far enough in the second direction for the driving feature 34 of the transfer shaft 32 to strike the driving feature 36 of the head 26. The striking action causes the head 26 to vibrate while the head 26 is still in a relatively neutral position. When the striking action occurs, the transverse centreline C-C of the transfer shaft 32 is angularly offset from the neutral axis B-B, and the transfer centreline of the head 26 is aligned with the neutral axis B-B.

The transfer shaft 32 continues to rotate in the second direction, causing the head 26 to rotate in the second direction. FIG. 5*e* shows the transfer shaft 32 at the maximum angle of rotation in the second direction. The maximum angle of rotation of the transfer shaft 32 in the second direction may be about 30°-35° from the neutral axis B-B. In this position the transverse centreline D-D of the head 26 is angularly offset from the neutral axis B-B, but by a smaller angle than the transverse centreline C-C of the transfer shaft 32. The maximum angle of rotation of the head 26 in the second direction may be about 20°-25° from the neutral axis B-B. In a preferred embodiment, when the transfer shaft 32 is at the maximum angle of rotation in the second direction, the transverse centreline C-C of the transfer shaft 32 is offset from the neutral axis B-B by about 35° and the transverse centreline D-D of the head 26 is offset from the neutral axis B-B by about 25°.

The transfer shaft 32 then rotates in the first direction back to the neutral position as shown in FIG. 5*a*, and the cycle repeats. This oscillation cycle repeats rapidly, at the frequency of the oscillations of the toothbrush shaft 16.

The accessory 10 provides both oscillating and vibrating action. The combination of these two movements provides a high-speed, vibrating, manipulative massage. This movement may provide improved, or different, stimulation compared with known accessories for electric toothbrushes. The relatively small size of the accessory 10 provides targeted stimulation that may be desirable for stimulating certain areas of the body.

The accessory 10 is small, discreet, portable, and its function is not obvious. This may advantageously avoid embarrassing situations for a user. For example, the apparatus 10 is unlikely to be discovered during luggage screening at an airport.

Figure 10:
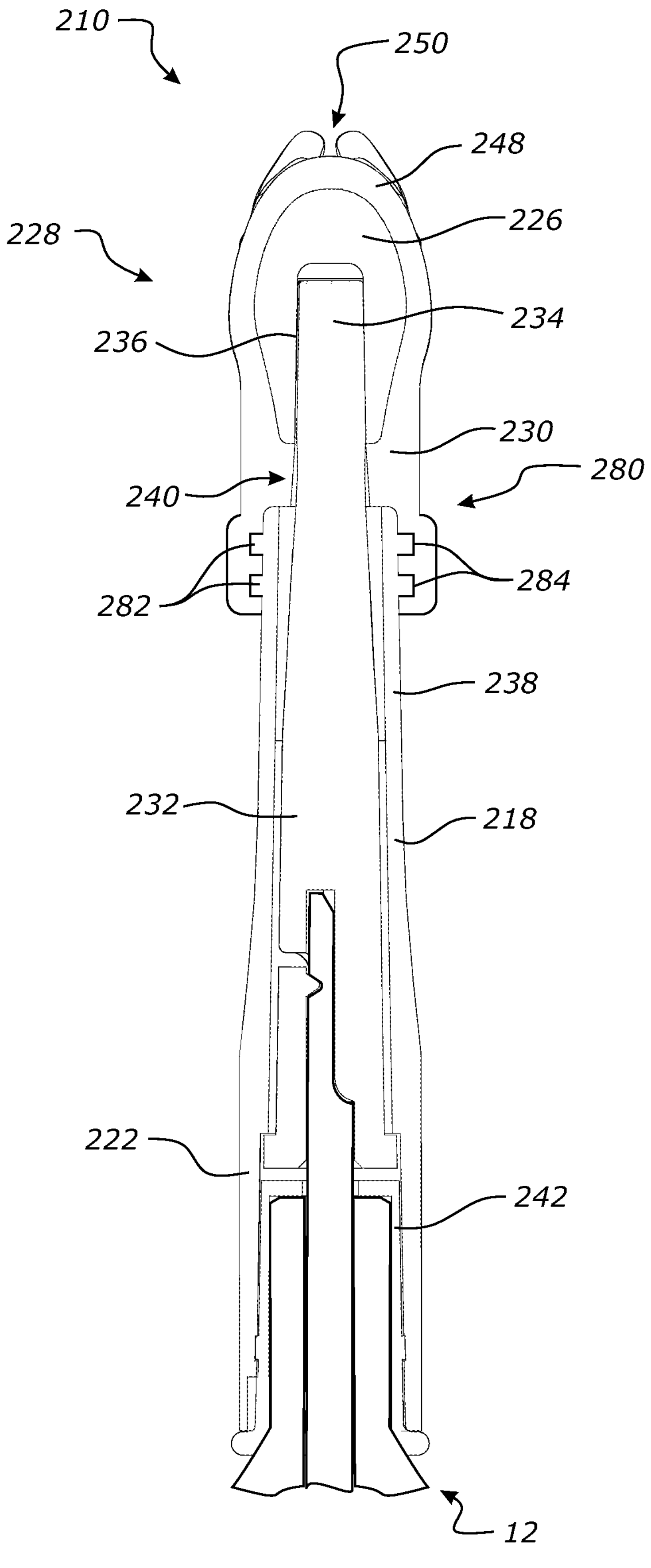
FIG. 10 shows a further alternative embodiment of a massage accessory.

FIG. 10 shows an alternative embodiment of a massage accessory 210 for use with an electric toothbrush 12. In this embodiment, the body 218 of the accessory 210 has a rotatable connection 280 between the base 222 and the head 226. The features and functionality of the alternative embodiment massage accessory 210 are otherwise the same as for the massage accessory 10, except as described below. Like numbers indicate like parts, with the addition of 200.

The rotatable connection 280 enables the head 226 and the cover 248 (if present) to rotate relatively freely relative to the sleeve 238. In the embodiment shown, the cover 248 is integrally formed with the rotatable connection 280. In an embodiment, the cover 248 is not integrally formed with the rotatable connection 280. In an embodiment, the attachment 210 does not have a cover 248 (similar to the embodiment of FIG. 6).

The rotatable connection may reduce damping between the head 226 and the sleeve 238, and enhance the oscillation and/or vibration of the head 226.

FIG. 10 shows an exemplary embodiment of a rotatable connection. The rotatable connection 280 is overmoulded or co-moulded with the head 226. The rotatable connection 280 is rotatably connected with the sleeve 238. The sleeve 238 has at least one engagement feature for engaging with the rotatable connection 280. In the embodiment shown, the sleeve 238 has two lips 282 for engaging with the rotatable connection 280. The rotatable connection 280 has at least one corresponding receiving feature for receiving the engagement feature(s) of the sleeve 238. In the embodiment shown, the rotatable connection 280 has two recesses 284 for receiving the lips 282 of the sleeve 238.

The rotatable connection 280 may comprise other suitable mechanisms. For example, the rotatable connection 280 may comprise a suitable oscillating joint that has substantially rigid components. For example, the rotatable connection 280 may comprise a bearing.

In an alternative embodiment, the rotatable connection 280 may be overmoulded or co-moulded with the sleeve 238.

In an embodiment the attachment 210 may comprise a biasing mechanism. In some embodiments the rotatable connection 280 is or comprises the biasing mechanism.

In the embodiment shown, the rotatable connection 280 comprises a flexible region 230. When the head 226 oscillates, the rotatable connection 280 rotates relative to the sleeve 238 and the flexible region 230 flexes. The relative degrees of rotation and flex can be adjusted by changing the tolerance of the fit of the rotatable connection 280 on the sleeve 238, and the material properties of the flexible portion. A relatively loose fit of the rotatable connection 280 on the sleeve 238 would provide a greater degree of rotation of the rotatable connection 280 relative to the sleeve 238 than a relatively tight fit of the rotatable connection 280 on the sleeve 238. A relatively tight fit of the rotatable connection 280 on the sleeve 238 would provide a greater degree of flex of the flexible portion 230 than a relatively loose fit of the rotatable connection 280 on the sleeve 238.

In some embodiments, the rotatable connection 280 may not comprise a flexible region 230.

In an embodiment, the rotatable connection 280 is formed from a flexible material, such as an elastomeric material, that enables the rotatable connection 280 to be removed from the shaft. This enables the head 226 to be removed for cleaning, and enables a user to replace the head 226 with an alternative head design. Any of the designs illustrated in FIGS. 7-9 may be configured for use with the alternative embodiment massage accessory 210.

Preferred embodiments of the invention have been described by way of example only and modifications may be made thereto without departing from the scope of the invention.

The invention claimed is:

1. A massage accessory for use with an electric toothbrush, the electric toothbrush having a body, and a shaft configured to generate an oscillating movement, the accessory comprising:

a transfer shaft having a driving feature, and a coupling configured to couple the massage accessory to the shaft of the electric toothbrush; and a head having a driving feature that is complementary to the driving feature of the transfer shaft;

wherein the driving feature of the transfer shaft is a lateral protrusion and the driving feature of the head is a lateral recess;

wherein the lateral protrusion has at least one edge that is configured to repeatedly strike a surface of the lateral recess to create vibration when the transfer shaft oscillates;

wherein a space is provided between the lateral protrusion of the transfer shaft and the lateral recess of the head when the transfer shaft and the head are engaged in a neutral position, such that oscillating movement of the transfer shaft causes rotational oscillation of the head and additionally causes vibration of the head by traversing the space during operation.

2. The massage accessory according to claim 1, wherein the transfer shaft has a substantially quadrilateral cross-section.

3. The massage accessory according to claim 1, wherein the shaft of the electric toothbrush is configured to oscillate back and forth along a semi-circular path and the head is configured to oscillate back and forth along a corresponding semi-circular path.

4. The massage accessory according to claim 1, further comprising a biasing mechanism configured to bias the head towards a neutral position.

5. The massage accessory according to claim 4, further comprising a body having a base at a proximal end of the body, the head positioned at or near a distal end of the body, and a flexible region between the base and the head.

6. The massage accessory according to claim 5, wherein the flexible region is or comprises the biasing mechanism.

7. A massage accessory for use with an electric toothbrush, the electric toothbrush having a body, and a shaft configured to generate a rotational oscillating movement, the accessory comprising:

a body having a base at a proximal end of the body, a head at or near a distal end of the body, and a flexible region between the base and the head; and a coupling configured to couple the massage accessory to the shaft of the electric toothbrush;

wherein the base, the head, and the flexible region are arranged such that the head of the accessory is configured to rotate about a longitudinal axis between the base and the head in response to the rotational oscillating movement of the shaft and is biased towards a neutral position after displacement, and the base of the accessory remains relatively stationary compared to the body of the electric toothbrush.

8. The massage accessory according to claim 7, wherein the flexible region is, or comprises, a biasing mechanism.

9. The massage accessory according to claim 8, wherein the flexible region is configured to flex as the head moves.

10. The massage accessory according to claim 7, wherein the base is rigid compared to the flexible region.

11. The massage accessory according to claim 7, wherein the head is rigid compared to the flexible region.

12. The massage accessory according to claim 8, wherein the head is configured to oscillate in response to the rotational oscillating movement of the shaft.

13. The massage accessory according to claim 12, wherein the shaft of the electric toothbrush is configured to oscillate back and forth along a semi-circular path and the head is configured to oscillate back and forth along a corresponding semi-circular path.

14. The massage accessory according to claim 7, wherein the head is configured to vibrate in response to the rotational oscillating movement of the shaft.

15. The massage accessory according to claim 7, wherein the flexible region is overmoulded or co-moulded with the head.

16. The massage accessory according to claim 7, wherein the body of the massage accessory further comprises a sleeve extending from the proximal end of the body and spaced apart from the head.

17. The massage accessory according to claim 16, wherein the flexible region is overmoulded or co-moulded with the sleeve.

18. The massage accessory according to claim 7, wherein the head has a massaging feature.

19. The massage accessory according to claim 18, wherein the massaging feature is a protrusion.

20. The massage accessory according to claim 7, wherein at least a portion of an exterior of the head comprises a soft material.

* * * * *